Oct. 28, 1969 A. B. NEWTON 3,474,632

THERMOELECTRIC CONDITIONING APPARATUS

Original Filed March 23, 1967 3 Sheets-Sheet 1

INVENTOR
ALWIN B. NEWTON

BY Thomas B. Hunter

ATTORNEY

THERMOELECTRIC CONDITIONING APPARATUS

Original Filed March 23, 1967

INVENTOR
ALWIN B. NEWTON

BY Thomas B. Hunter
ATTORNEY

INVENTOR
ALWIN B. NEWTON

BY Thomas B Hunter
ATTORNEY

United States Patent Office 3,474,632
Patented Oct. 28, 1969

3,474,632
THERMOELECTRIC CONDITIONING APPARATUS
Alwin B. Newton, York, Pa., assignor to Borg-Warner Corporation, Chicago, Ill., a corporation of Illinois
Continuation of application Ser. No. 625,392, Mar. 23, 1967. This application Oct. 21, 1968, Ser. No. 781,679
Int. Cl. F25b *21/00*
U.S. Cl. 62—3 2 Claims

ABSTRACT OF THE DISCLOSURE

A thermoelectric device in which certain operating parameters, e.g. *Q/I* and C.O.P., are optimized by adjusting the geometry of the thermoelectric elements to compensate for variations in ΔT.

This is a continuation of application 625,392, filed Mar. 23, 1967, now abandoned.

SUMMARY AND BACKGROUND OF THE INVENTION

This invention relates to improvements in thermoelectric conditioning apparatus and more particularly to air conditioning units which are adapted to effect heat pumping between a stream of conditioned air and a stream of "sink" air.

In one known thermoelectric heat exchange apparatus or conditioning unit, the heat exchange fins for the conditioned air side and/or the sink side conduct the electrical current from one thermoelectric element to the other. This arrangement has numerous advantages over known prior art units in that the fins perform a dual function; and the space requirements and weight of this type of unit are greatly reduced in comparision with conventional thermoelectric conditioning units having the same capacity. It will also be appreciated that thermoelectric conditioning units are adapted to heat or cool the air to be conditioned, the transition from the cooling mode to the heating mode being effected by merely reversing the direction of the electrical current supplied to the thermoelectric elements, hereinafter referred to simply as thermoelements.

Under operating conditions, particularly in an air-to-air heat transfer system, there is often a large variation in the temperature differentials existing across thermoelectric elements located in different parts of the unit. For example, in one part of the unit the sink air on one side of a thermoelement may be at about 110° F. and the conditioned air on the opposite side may be approximately 40° F., thereby imposing an effective ΔT of about 75°–80° F. across the thermoelement, after allowing for the temperature differences between the air streams and the adjacent sides of the thermocouple. At the other extreme, the conditioned air in some other section of the unit may be about 100° F. and sink air about 95° F. This then produces a temperature differential across the thermoelement in this section, allowing for the air-couple differential, of about +5° F.

Both the coefficient of performance (C.O.P.) and the heat pumped per unit of current (*Q/I*) for any given thermoelectric material of fixed geometry are a function of two independent variables: (1) the current applied and (2) the ΔT across the thermoelement. To achieve optimum performance where a wide variation in operating ΔT's exists, the obvious choice would be to vary the current throughout the unit. As a practical matter, this is impossible to do because most of the thermoelements are connected in series and the current flow through each couple is the same. Within certain limits, the current may be varied by connecting certain strings of thermoelements in parallel; but in most units, practically all the couples are series connected.

Since it is not feasible to design a unit which adjusts current flow to compensate for variations in ΔT to achieve optimum C.O.P. or *Q/I*, the present invention proposes to adjust the geometry of the thermoelements, specifically the area to length ratio (*A/L*), to achieve this objective. By constructing the heat exchanger with thermoelements having different *A/L* characteristics, one can design a unit to optimize either C.O.P. or *Q/I* depending on the particular application requirements.

It should be understood, however, that there are paths of optimization other than C.O.P. or *Q/I*. The determination of these optimization goals are based on certain trade offs which are selected for any given installation or design.

It is, therefore, a principal object of the invention to provide an improved thermoelectric heat exchange apparatus which may be designed to operate at close to maximum efficiency under various operating conditions.

Another object of the invention is to provide a thermoelectric heat exchange assembly which secures more efficient use of uniformly sized heat transfer surfaces.

Additional objects and advantages will be apparent from reading the following detailed description taken in conjunction with the drawings wherein.

Figure 1:
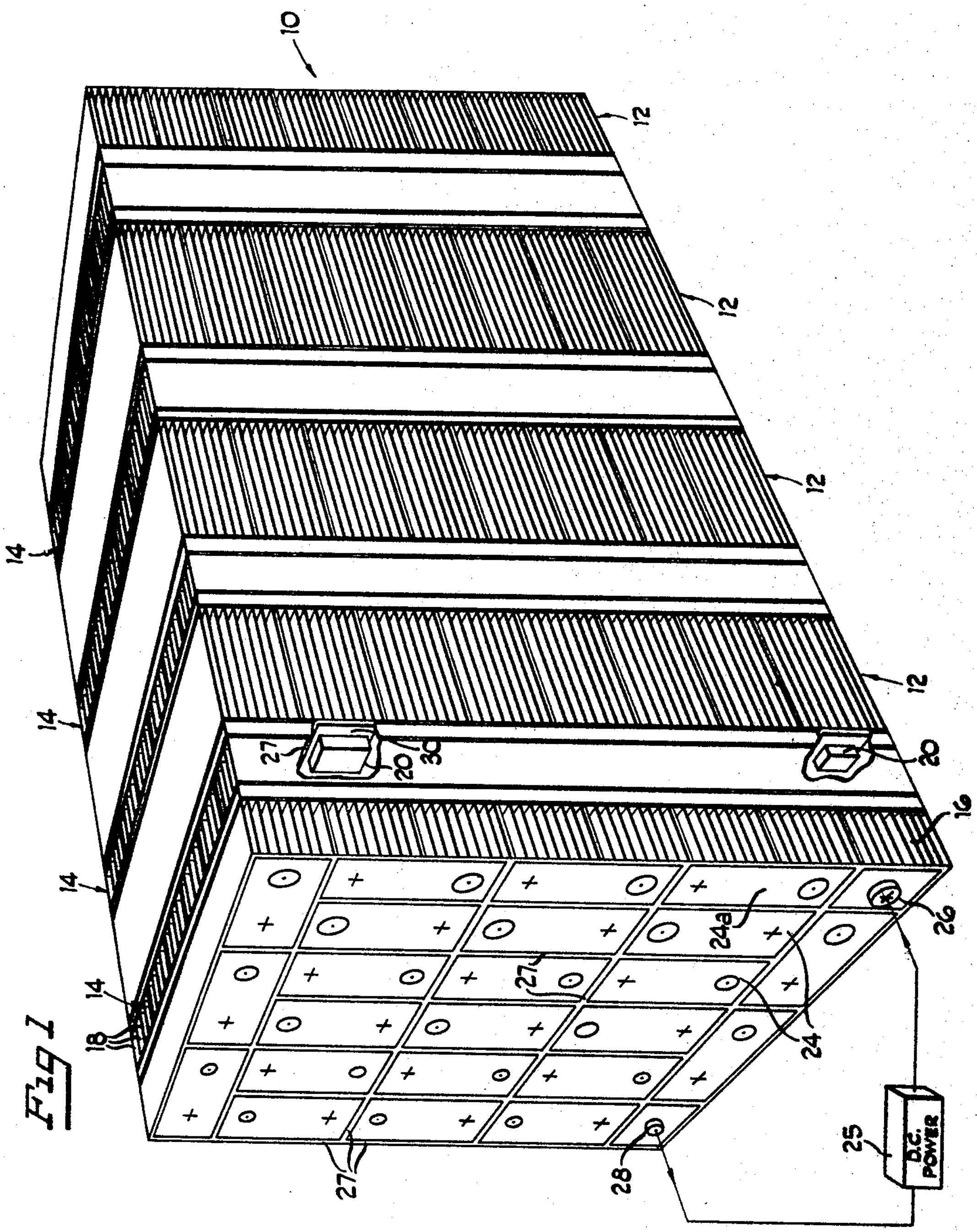
FIGURE 1 is an isometric view, partially broken away, showing the improved thermoelectric conditioning unit constructed in accordance with the prinicples of the present invention.

Referring now to the drawings, FIGURE 1 shows a preferred embodiment of the invention. The particular design illustrated is that of a cross-flow type conditioning unit, so called because the air to be conditioned passes at right angles with respect to the flow of sink air. By way of definition, the *sink* side of any thermoelement under consideration is that which is in proximal heat exchange contact with a heat exchange medium used to supply or abstract heat, depending upon whether the unit is functioning in its heating mode or its cooling mode. The *load* side of any thermoelement under consideration is that which is in proximal heat exchange contact with conditioned air circulating to and from a load, usually and enclosed space or zone. Conversely, air passing in contact with the sink side of a particular thermoelement (or group thereof) will be referred to as *sink air;* and air passing in contact with the load side of a particular thermoelement (or group thereof) will be referred to as *conditioned air.*

The conditioning unit, designated generally at 10, comprises alternating sections 12, 14 of flow passages for the sink air and the conditioned air respectively. A plurality of heat exchange fins 16, 18 extend across the path of both air streams, said fins being in thermal and electrical contact with alternating N- and P-type thermoelements 20, 22, respectively located between adjacent fin sections. The fins act as both heat transfer elements and as electrical conductors to conduct the unidirectional electrical energy in series through the thermoelements. Bus bars 24 at opposite ends of the unit conduct current from one string of thermoelements and fins to an adjacent string. It will be noted that unidirectional electrical energy, supplied by some suitable source 25, is connected to a first terminal 26 and flows through the string at the lower right-hand section of the unit, as illustrated in FIGURE 1, to the opposite end, each string being electrically insulated from an adjacent string by epoxy resin or other suitable insulating material 27. The current emerges from the opposite end of the string to be transferred by a bus bar (not shown) to the superjacent string. Flowing from right to left in the latter string, it reaches the left-hand end of the module and passes through bus bar **24*a* to another superjacent string and so forth through the entire unit until it emerges at terminal 28 connected to the other side of the D.-C. power supply 25**. Current passing into the plane of the bus bars, as shown in FIGURE 1, is denoted by $+$; and current passing out of the plane is denoted by $\odot$.

Figures 2, 4:
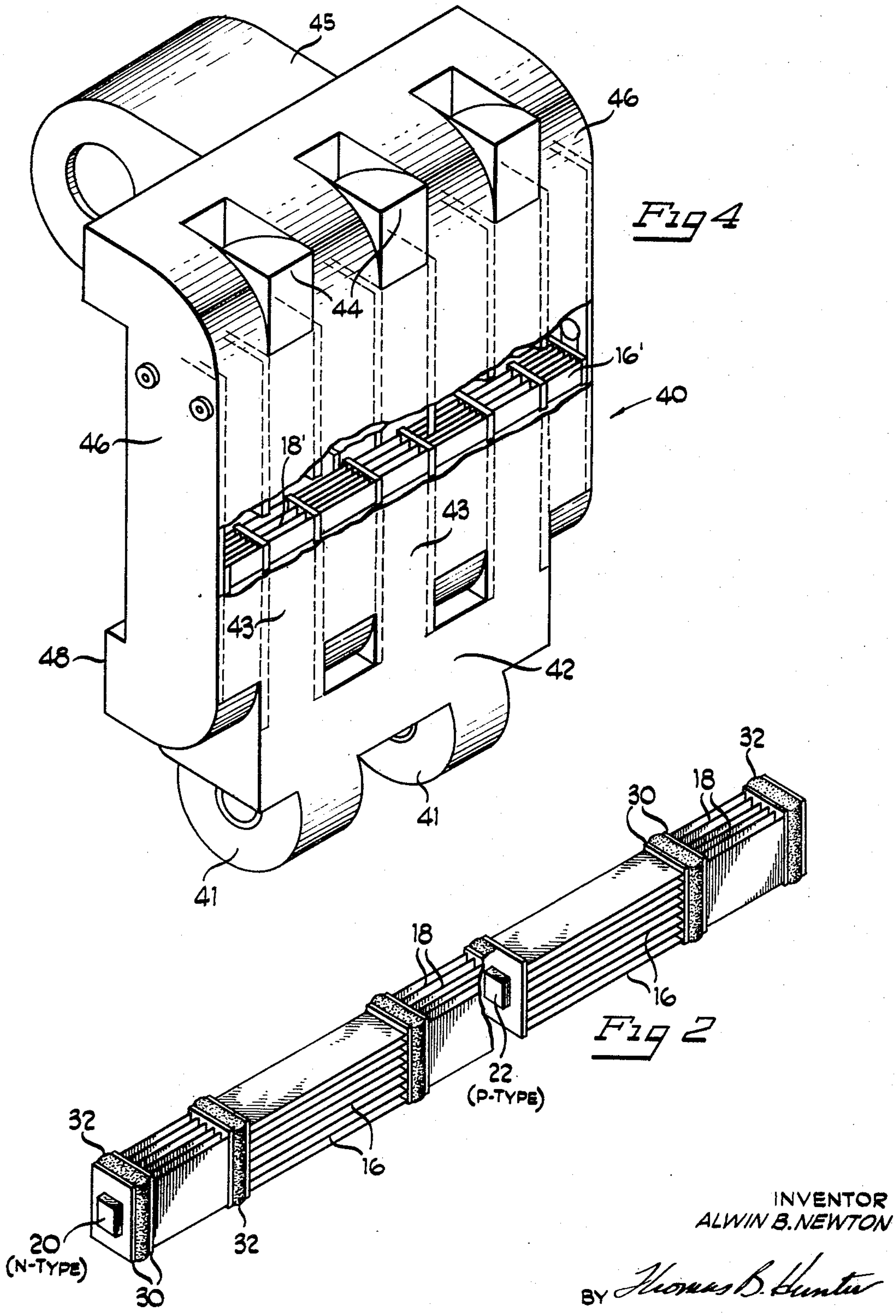
FIGURE 2 is a detailed isometric view of one of the "strings" of thermoelectric elements and heat exchange fins used in the construction of the apparatus of FIGURE 1.
FIGURE 4 is a modification of the conditioning unit shown in FIGURE 1.

As shown best in FIGURE 2, each of the thermoelements 20, 22 is soldered, or otherwise mechanically and electrically secured, between a pair of generally rectangular conductor plates 30 of copper, aluminum or other suitable material. The other side of plates 30 are soldered or otherwise secured to the fins 16 and 18. The space surrounding the thermoelements may be filled with insulating material 32, such as polyurethane foam, or other suitable material having low thermal conductivity and good moisture resistance.

While not shown, means are provided for keeping the sink and conditioned air streams on the entrance and delivery sides separated from each other. Also, the blowers (not shown) for the sink and conditioned air may be associated with the unit or may be located remotely and connected thereto by suitable ducting.

To better illustrate the wide ΔT variations existing in a conditioning unit of the type shown in FIGURE 1, the following table gives examples of sink and load side couple temperatures, together with corresponding ΔT and preferred $A/L$ values (assuming 31 amps are supplied), through a typical section of a 5 x 6 cross-flow unit. Although FIGURE 1 shows a 6 x 8 unit, the temperature differences are generally comparable.

TABLE

| | | | | | | |
|---|---|---|---|---|---|---|
| Sink Side | 104 | 104 | 104 | 104 | 104 | 104 |
| Load Side | 90 | 74 | 65 | 55 | 44 | 36 |
| $A/L$, ΔT | 8.8, 14 | 3.8, 30 | 2.8, 39 | 2.1, 49 | 1.70, 60 | 1.49, 68 |
| Sink Side | 107 | 107 | 107 | 107 | 107 | 107 |
| Load Side | 90 | 75 | 66 | 56 | 46 | 38 |
| $A/L$, ΔT | 7.6, 17 | 3.5, 32 | 2.65, 41 | 2.04, 51 | 1.65, 61 | 1.47, 69 |
| Sink Side | 110 | 110 | 110 | 110 | 110 | 111 |
| Load Side | 90 | 75 | 67 | 58 | 48 | 40 |
| $A/L$, ΔT | 6.4, 20 | 3.2, 35 | 2.55, 43 | 1.97, 52 | 1.63, 62 | 1.44, 71 |
| Sink Side | 113 | 113 | 113 | 113 | 114 | 114 |
| Load Side | 90 | 76 | 68 | 59 | 50 | 43 |
| $A/L$, ΔT | 5.4, 23 | 2.9, 37 | 2.44, 45 | 1.90, 54 | 1.57, 64 | 1.44, 71 |
| Sink Side | 116 | 116 | 116 | 116 | 117 | 117 |
| Load Side | 90 | 77 | 69 | 61 | 52 | 45 |
| $A/L$, ΔT | 4.8, 26 | 2.8, 39 | 2.35, 47 | 1.85, 55 | 1.53, 65 | 1.43, 72 |

In the above table, it is assumed that the sink air is flowing from top to bottom while the conditioned air is moving from left to right. Accordingly, the lowest ΔT, shown in the upper left-hand corner, is the point at which the sink air and conditioned air enter the unit, the sink air being at its lowest temperature and the conditioned air being at its highest temperature. In the lower right-hand corner exists the highest ΔT. This corresponds to the point where the sink air is at its highest temperature and the conditioned air is at a low temperature.

Figures 3, 5:
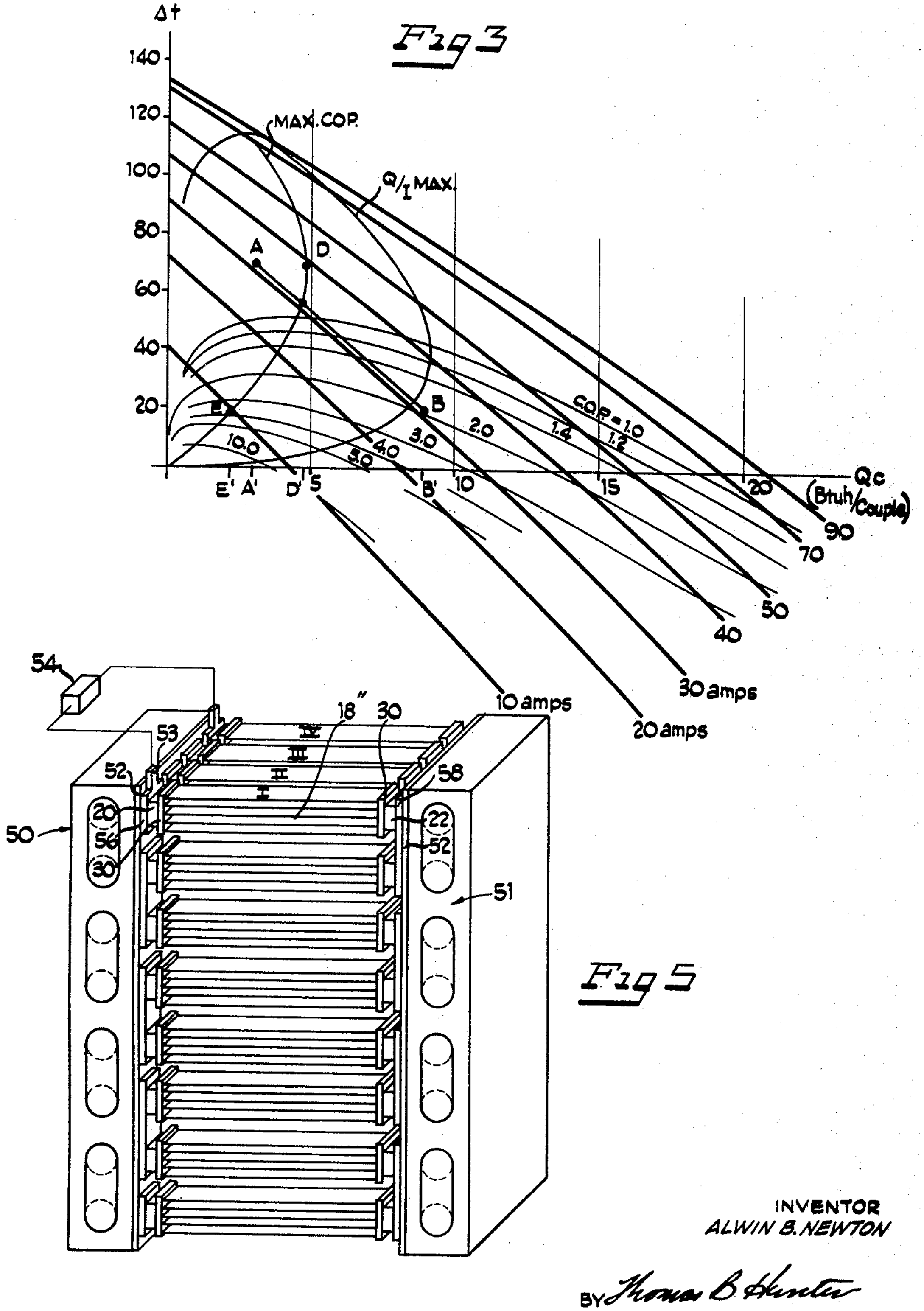
FIGURE 3 is a typical thermoelectric loading curve which is referred to in connection with the optimization of C.O.P. or *Q/I* by varying the *A/L*.
FIGURE 5 is another modification.

The wide variations in ΔT demonstrated above give rise for the need of the present invention to effect optimization of certain parameters, such as C.O.P. and $Q/I$. This can be shown more clearly by referring to FIGURE 3 which illustrates a loading diagram for a typical thermoelectric element having an $A/L$ of 1.97 and assuming a sink temperature of 120° F. The line A–B in FIGURE 3 illustrates operations of a typical thermoelectric couple with 31 amps applied. The ΔT within the system thus varies from a minimum of 20° at point B to a maximum of 70° at point A. It should be noted that line A–B crosses both the maximum C.O.P. line and the maximum $Q/I$ line. At point B, the heat pumping capacity per couple is approximately 8.9 B.t.u.h., as indicated at point B′, and the C.O.P. is approximately 1.95. If the current for this particular couple is modified so that it functions at maximum C.O.P., the couple must in effect operate at point E. Under this condition, the C.O.P. will become approximately 3.70; and the current required to effect operation is about 10 amps with a corresponding capacity of 2.3 B.t.u.h. indicated at E′. Since it is impractical to vary the current in a string of series connected couples, the present invention proposes to vary the $A/L$ ratio.

If the $A/L$ ratio of 1.97 is increased by a factor equal to the ratio of currents at B and E, the maximum C.O.P. of 3.70 will be achieved at 31 amps, and the heat pumped by the couple will be increased in the same ratio. Thus the $A/L$ ratio becomes $I_B/I_E \times 1.97 = 6.1$, and the heat pumped per couple becomes $I_B/I_E \times 2.3 = 7.1$ B.t.u.h. This is nearly as much heat as would be obtained by 31 amps thru the original $A/L$ of 1.97, but the C.O.P. has increased from 1.95 to 3.70.

Likewise for point A at 70° ΔT, decreasing the $A/L$ ratio by $I_A/I_D$ will provide maximum C.O.P.

$$^{31}/_{39.5} \times 1.97 = 1.54$$

for the new optimized $A/L$. Heat pumped at 31 amps with this modification will be $^{31}/_{39.5} \times 4.8 = 3.77$ B.t.u.h. which is more heat than would have been pumped by 31 amps at the original $A/L$ and yet an increase in C.O.P.

After all, or a suitable portion of the couples in an assembly are so modified, a final addition or subtraction of a small number of couples is made to reach the original capacity desired.

Optimizing $Q/I$ is achieved in the same manner as the examples for optimization of C.O.P. Also while either the area or the length of the individual thermoelectric couples may be changed to vary the $A/L$ ratio, it is preferred that the length be kept constant while varying the area. In this way, the spacing between the conductor plates will not be disrupted in manufacturing the unit.

A modification of the conditioning unit previously described is shown in FIGURE 4. The air conditioning device shown in FIGURE 4 may employ a slight modification of the novel thermoelectric couple assemblies of FIGURE 2. This unit, shown generally at 40, includes blowers 41 for receiving air to be cooled and delivering it to a plenum chamber 42 and from there to a plurality of vertical ducts 43 in which are arranged modified form of fin sections 18. These fins will be designated at 18′. The air after passing through fins 18′ is discharged from ducts 43 through openings 44 into the room or other zone to be conditioned. At the upper portion of the unit, blower 45 delivers sink air from outside (or some other suitable source) down through vertically extending ducts 46 in which are arranged fins 16′. The air passing through fins 16′ is exhausted through openings 48 at the back of the unit.

Although the description so far has been directed to applications of the invention for gas-to-gas heat exchange assemblies, the concept is also useful in liquid-to-gas and liquid-to-liquid heat exchange systems. FIGURE 5 shows a liquid-to-gas modification of the invention in which the gas, ordinarily air, is directed across a fin-type heat exchange section and the sink side is supplied with a liquid heat exchange medium, normally water.

The assembly is constructed in substantially the same manner as the system shown in FIGURE 1 with the following exceptions: (1) the sink side of the thermocouples is maintained in contact with liquid cooled heat exchange elements, and (2) only one section of gas heat exchange elements extends across the flow path.

Heat exchangers 50 and 51 may comprise metallic plates which are cored or otherwise provided with fluid passages for the circulation of water or other suitable heat exchange medium. Although not shown, the liquid may be circulated to and from a water-saving device such as a cooling tower, or similar unit. The side of each heat exchanger connected to the thermoelements must be electrically insulated in such a way that good heat transfer is maintained. Various means for achieving this objective are well known; and by way of example, this may take the form of an epoxy resin, coating 52, or in the case of an aluminum heat exchanger, the surface may be anodized.

The load side heat exchange elements are constructed in substantially the same manner as those previously described. A first terminal 53, connected to one side of D.-C. power supply 54 is attached to a bus bar 56 secured to the inwardly facing surface of heat exchanger 50. An N-type thermoelectric element 20 is sandwiched in between bus bar 56 and a conductor plate 30. The heat exchange fins 18'' extend across the flow path of the air which is circulated through the heat exchange elements by any suitable means such as a blower (not shown). Fins 18'' are attached to another conductor plate 30 on the other side; and a P-type thermoelectric element 22 is sandwiched in between conductor plate 30 and a bus bar 58 secured to the electrically insulated, inwardly facing surface of heat exchanger 51. The current then flows from right to left through the second group of heat exchange fins to the thermoelectric couple assembly adjacent heat exchanger 50. Although the number of heat exchange sections is a matter of choice, FIGURE 5 shows four such sections which are designated at I, II, III and IV in the direction of air flow. The pattern of current flow is downwardly through section I of heat exchange fins and then over to the adjacent section II. Current eventually emerges at a terminal 60 connected to the upper part of section IV, said terminal being coupled to the other side of D.-C. power supply 54.

In order to construct a liquid-to-liquid heat exchange system, the conducting fins 18'' may be replaced by a heat exchanger of the type shown at 50 or 51. Since temperature differentials across different thermoelectric elements would vary regardless of the particular heat exchange system, various parameters can be optimized by varying the geometry of the thermoelectric elements in the manner described above.

The invention is also useful in optimizing the efficiency of P-type and N-type thermoelectric elements. It is well known that characteristics of the two different materials vary to a considerable degree. Accordingly, it is desirable to separately optimize the heat pumping efficiency and other parameters without varying the longitudinal spacing between adjacent conductor plates. This would permit the use of standardized heat exchange fin sections to facilitate assembly of a module.

While this invention has been described in connection with certain specific embodiments thereof, it is to be understood that this is by way of illustration and not by way of limitation; and the scope of the appended claims should be construed as broadly as the prior art will permit.

What is claimed is:

1. A thermoelectric heat transfer assembly comprising: a plurality of thermoelectric panels arranged in spaced relation to provide a plurality of spaced heat exchange zones therebetween through which a sink side and a load side heat exchange medium are adapted to be circulated in alternate fashion, each said thermoelectric panel comprising a pair of sheet-like members having at least two spaced apart conductor plates electrically insulated from each other, said pair of sheet-like members being arranged such that the conductive plates in one said member form confronting pairs in generally registered relation with the conductive plates in the other said member, and P- and N-type thermoelectric elements operatively joined to said confronting pairs of conductor plates; a plurality of individual, spaced apart, conductor-heat transfer elements operatively connected to the conductor plates in adjacent thermoelectric panels and located within said heat exchange zones to form extended hot and cold junctions between a P-type thermoelectric element in one panel and an N-type thermoelectric element in an adjacent panel, said conductor-heat transfer elements providing a bundle of series connected strings of thermoelectric couples having their hot and cold junctions respectively disposed in alternate heat exchange zones; panel means associated with opposite ends of said assembly having conductor elements associated therewith, said panel means providing additional heat exchange zones between said panel means and an adjacent thermoelectric panel; conductor-heat transfer elements connecting the terminal portions of two of said strings of thermoelectric couples to said conductor elements, and further characterized by the area to length ratio of certain of said thermoelectric elements differing from the area to length ratio of certain other thermoelectric elements to compensate for variations in the operating temperature differential across said elements.

2. A thermoelectric heat transfer assembly as defined in claim 1, wherein said conductor-heat transfer elements comprise fins extending in the same direction as the circulation of a gaseous heat exchange medium flowing through the respective heat exchange zones.

References Cited

UNITED STATES PATENTS

| | | | |
|---|---|---|---|
| 2,844,638 | 7/1958 | Lindenblad | 62—3 |
| 2,993,080 | 7/1961 | Poganski | 136—4 |
| 3,090,206 | 5/1963 | Anders | 62—3 |
| 3,137,142 | 6/1964 | Venema | 62—3 |
| 3,138,934 | 6/1964 | Roane | 62—3 |
| 3,248,889 | 5/1966 | Zimmermann | 62—3 |

FOREIGN PATENTS

| | | |
|---|---|---|
| 1,163,301 | 4/1958 | France. |
| 1,301,736 | 7/1962 | France. |
| 1,323,569 | 3/1963 | France. |

WILLIAM J. WYE, Primary Examiner